United States Patent Office 2,901,175
Patented Aug. 25, 1959

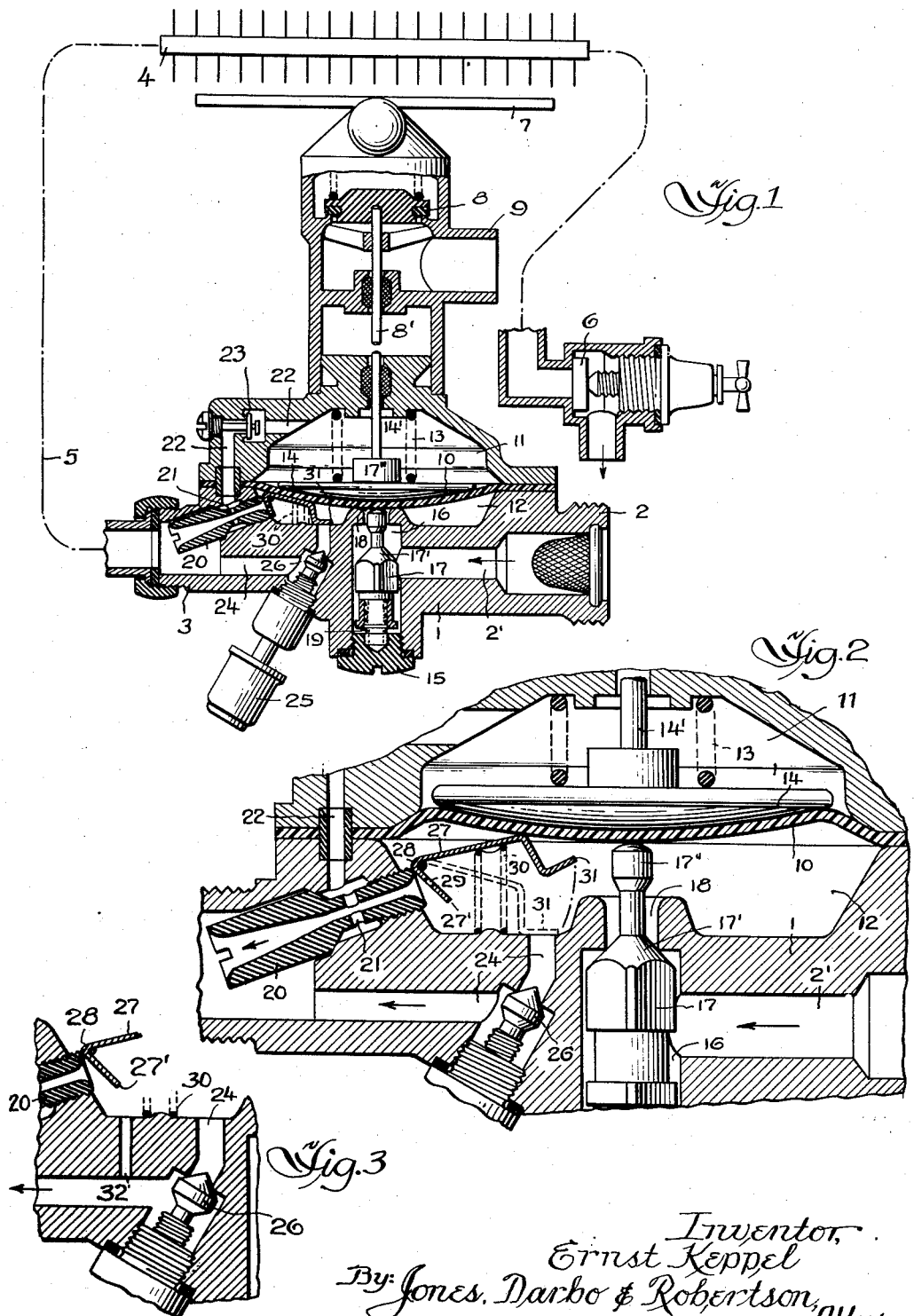

2,901,175
WATER FLOW REGULATOR FOR WATER HEATER

Ernst Keppel, Remscheid, Germany, assignor to Joh. Vaillant K.G., Remscheid, Germany Application April 8, 1958, Serial No. 727,159
Claims priority, application Germany May 31, 1957
7 Claims. (Cl. 236—25)

This invention relates to a continuous-flow type heater which is equipped with a water flow regulator. Generally, the diaphragm of the water flow regulator has the function simultaneously also to admit the fuel supply, e.g., to open a burner gas valve, so that the diaphragm also functions as a water deficiency safety appliance. It is a well known phenomenon with water flow regulators of this type that, in particular with high non-regulated water pressure, relatively great quantities of water not yet heated up are discharged before the regulating valve has reached its operative position. This is particularly the case if, with gas heated apparatus of this kind, the lifting movement of the diaphragm is artificially retarded to obtain a slow action ignition.

It has already been proposed to prevent the preliminary water discharge, which, for obvious reasons, is of course undesirable, by incorporating in addition to the regulating valve a shut-off element controlled by the diaphragm, so that this shut-off element closes the water passage channel fully or in part during the period of adjustment of the regulating valve. During this action, the shut-off element having the form of a slide valve follows positively the lift movement of the diaphragm. This makes it necessary to design and arrange the shut-off element so that, with a low non-regulated water pressure, it opens completely even when actuated by only a relatively small lift movement of the diaphragm. If the non-regulated water pressure is high, where a relatively great lifting movement of the diaphragm is necessary to bring the regulating valve into the operative position, the slide valve in the known arrangement has already opened the water passage duct a considerable time before the regulating valve has moved into its operative position. The consequence is that, especially in the event of a high non-regulated water pressure, a preliminary water discharge will take place, the quantity thereof being particularly great in this case.

The present invention has therefore for its object the elimination of this disadvantage present with the prior art device which has been proposed for the purpose of the throttling of the preliminary water discharge.

According to the invention, this object is accomplished by providing a control valve which is forced by the diaphragm against the action of the spring into the closing position and is retained in this position during the time of adjustment of the regulating valve by means of the non-regulated water pressure charging the control valve until the service pressure is reached by the adjusting process of the regulating valve, the service pressure then being overcome by the spring tension of the control valve. Thus, the control valve in the arrangement conceived and constructed in accordance with the invention does not follow positively the movement of the diaphragm, but is retained in the closing position until the service water pressure is adjusted by the regulating valve. Consequently, any preliminary water discharge at low as well as at high non-regulated water pressure is eliminated.

An embodiment of the invention illustrating the inventive concept in detail is shown in the accompanying drawings in which:

Fig. 1 is a vertical section of the present regulator;
Fig. 2 is an enlargement of a portion of the regulator shown in Fig. 1, and Fig. 3 is a fragmentary view in vertical section showing a modification of the regulator shown in Figs. 1 and 2.

Referring to the drawings, these are shown in sectional view a valve arrangement 1 of a gas heated continuous flow apparatus which is fitted with a connection socket 2 for the connection of the valve arrangement 1 to a cold water supply pipe. A flow pipe 5 that can be closed by means of a discharge tap valve or faucet 6 and passing through a heater 4 is connected to a regulator outlet connection socket 3. Numeral 7 designates a gas burner, which, via a water deficiency safety valve 8, is supplied with gas through a gas pipe that is connected to the valve arrangement at 9.

A regulator diaphragm 10 separating an upper diaphragm chamber 11 from a lower diaphragm chamber 12 is inserted into the valve arrangement 1. A diaphragm disc 14 loaded by a spring 13 lies on the diaphragm 10, the shaft 14' of the diaphragm disc 14 cooperating with the stem 8' of the water deficiency safety valve 8.

The cold water inlet socket 2 communicates through an inlet channel 2' with a bore 16 that is closed at its lower end by a screw plug 15 and opens up into the lower diaphragm chamber 12. A regulating valve 17 having a tetragonal cross-section, a tapered portion 17' and a head portion 17" which passes through a contracted portion 18 of the bore 16 is guided in said bore 16. A spring 19 forces the valve body head 17" in contact with the diaphragm 10.

A Venturi tube 20 opening up into the lower diaphragm chamber 12 establishes a communication between the diaphragm chamber 12 and the regulator outlet socket 3 or the flow pipe 5 respectively. The Venturi tube 20 has in the most contracted portion of its cross-section lateral bores which open up into a duct 22. This duct 22 leads via an untight plate valve 23 (so-called slow action ignition valve) into the upper diaphragm chamber 11.

A secondary water duct 24 by-passing the Venturi tube 20 and governed by a manually adjustable valve 26 (temperature selector valve) that can be operated by actuating a handle 25 also opens up into the lower diaphragm chamber 12. A control valve in the form of a bell-crank valve flap 27 that can be pivoted about a fulcrum point 28 is arranged in front of the mouth of the Venturi tube 20 inside the lower diaphragm chamber 12. The one valve plate 27' of the bell-crank control valve 27 has a small orifice 29 to admit the passage of a minimum quantity of water. A compression spring 30 lifts the valve 27, so that the valve plate 27' clears the nozzle opening of the Venturi tube 20. A cranked portion 31 of the control valve 27 is so designed and arranged that the opening of the secondary water duct 24 can be closed by this cranked portion or valve plate of the control valve.

The operation of the arrangement described is as follows:

With the tap valve 6 closed, pressure balance exists in the diaphragm chambers 11, 12. Consequently, the diaphragm 10 is forced by the spring 13 in the position shown in Fig. 1. This, in turn, causes the control valve 27 having tensioned spring 30 to be moved into the closing position represented in Fig. 1, where the nozzle opening of the Venturi tube 20 is closed by the valve plate 27' and the opening of the secondary water duct 24 is closed by the cranked portion or valve plate 31.

If now the tap valve 6 is opened, a small minimum quantity of water coming from the diaphragm chamber 12 and passing through the small orifice 29, which may also be substituted by a narrow communication bore 32, shown in Fig. 3, between the diaphragm chamber 12 and the duct 24, will then flow through the flow pipe. A pressure head which still corresponds to the full non-regulated water pressure, because the regulating valve 17 still fails to throttle the passage 18, is now built up in the chamber 12 beneath the diaphragm 10. The pressure head lifts the diaphragm against the action of the spring 13; this causes the water in the chamber 11 to be displaced through the untight slow action ignition valve 23 slowly towards the open tap valve 6. The lifting movement of the diaphragm 10 is thereby retarded, so that the water deficiency safety valve 8 is slowly opened. During this retarded lifting movement of the diaphragm 10, the control valve 27, which is still loaded by the full water pressure, is retained in the closing position against the action of the spring 30, so that only the small minimum quantity of water is allowed to pass through the flow pipe 5. After the diaphragm has performed a sufficient lifting stroke, the regulating valve 17 is moved into its operative position and throttles with its tapered portion 17' the cross-section of the passage 18, so that a service pressure is produced in the diaphragm chamber 12 that is reduced as compared to the non-regulated water pressure. The spring 30 is so designed that it can lift the control valve 27 under the reduced service pressure into the position as shown in Fig. 2 so that now the openings of the Venturi tube 20 and of the secondary water duct 24 are cleared so as to permit the passage of the service quantity of water. The regulating valve adjusts itself in well known manner so that the dynamic pressure difference produced at the Venturi tube 20 is kept constant and thereby the quantity of water flowing in is regulated. The adjusted quantity of water can be more or less increased by opening the temperature selector valve thereby determining the discharge temperature of the water.

An essential point of the present invention is that the control valve 27 is retained in the closing position by means of the still non-regulated water pressure until the regulating valve 17 performs a sufficient throttling effect and reaches its operative position. An undesirable preliminary water discharge is prevented by the control valve 27 during the time of adjustment of the regulating valve which is retarded by the slow action ignition valve.

Invention is claimed as follows:

1. In a water flow regulator for a water heater having a downwardly biased flexible diaphragm separating the water chamber of said regulator into an upper chamber and a lower chamber, valve means responsive to the position of said diaphragm for controlling the flow of gas to a burner, a water intake connected to said lower chamber and containing therein an intake regulator valve having a valve stem biased for continuous engagement with said diaphragm and responsive to the position thereof, a regulator outlet, a venturi tube providing a first outlet passageway connecting said lower chamber with said regulator outlet, a faucet remotely controlling flow through said regulator outlet, a passageway connecting the throat of said venturi tube with said upper chamber and having means therein for retarding flow therethrough, the improvement therein which comprises a control valve having a valve plate positioned to control the flow of water from the lower chamber through said venturi, operating means connected with said control valve and arranged to be engaged by said diaphragm to close the same upon downward movement of said diaphragm, the inner surface of said valve plate being exposed to the water pressure within said lower chamber whereby pressure exerted thereagainst maintains said control valve in closed position irrespective of the position of said diaphragm, means providing a permanently open restricted passage between said lower chamber and said regulator outlet, and spring means urging said control valve to open position, the force of said spring means being such that said control valve is opened thereby upon reduction in pressure to a predetermined level in said lower chamber resulting from the opening of said faucet, whereby regulated flow through said regulator outlet is initiated.

2. Structure in accordance with claim 1 wherein the valve plate of the control valve is pivotally mounted within the lower chamber of the regulator.

3. Structure in accordance with claim 1 wherein the permanently open restricted passage comprises an orifice in the valve plate of the control valve providing limited connection between the lower chamber and the first outlet passageway.

4. Structure in accordance with claim 1 wherein the lower chamber is provided with a second outlet passageway connecting with the regulator outlet and the control valve has a second valve plate positioned to control the flow of water through said second outlet passageway and said control valve is pivotally mounted within said lower chamber to open both the first outlet passageway and said second outlet passageway simultaneously and to simultaneously close both said passageways.

5. Structure in accordance with claim 4 wherein said permanently open restricted passage comprises an independent channel connecting said lower chamber with said second outlet passageway.

6. Structure in accordance with claim 4 and including a manually adjustable valve arranged in the second outlet passageway to control the rate of flow of water therethrough when the control valve is open.

7. In a water flow regulator for a water heater having a downwardly biased flexible diaphragm separating the water chamber of said regulator into an upper chamber and a lower chamber, valve means responsive to the position of said diaphragm for controlling the flow of gas to a burner, a water intake connected to said lower chamber and containing therein an intake regulator valve having a valve stem biased for continuous engagement with said diaphragm and responsive to the position thereof, a regulator outlet, a venturi tube providing a first outlet passageway connecting said lower chamber with said regulator outlet, a second outlet passageway connecting said lower chamber with said regulator outlet, a manually adjustable valve arranged in said second outlet passageway for controlling the rate of water flow therethrough, a faucet remotely controlling flow through said outlet, a passageway connecting the throat of said venturi tube with said upper chamber and having means therein for retarding flow therethrough, the improvement therein which comprises a control valve having a valve plate positioned to control the flow of water from the lower chamber through said venturi and having a second valve plate positioned to control the flow of water from said lower chamber to said second outlet passageway, said control valve being pivotally mounted within said lower chamber to simultaneously open both said first outlet passageway and said second outlet passageway and to simultaneously close both said passageways, operating means connected with said control valve and arranged to be engaged by said diaphragm to close the same upon downward movement of said diaphragm, the inner surfaces of both said first valve plate and said second valve plate being exposed to the water pressure within said lower chamber whereby pressure exerted thereagainst maintains said control valve in closed position irrespective of the position of said diaphragm, said first valve plate having an orifice therein providing limited connection between said lower chamber and said first outlet passageway when said control valve is in closed position, and spring means urging said control valve to open position, the force of said spring means being such that said control valve is opened thereby upon reduction in pressure to a predetermined level in said lower chamber resulting from the opening of said faucet, whereby regulated flow through said outlet is initiated.

References Cited in the file of this patent

UNITED STATES PATENTS

| | | |
|---|---|---|
| 2,274,017 | Weber | Feb. 24, 1942 |
| 2,841,172 | Donges | July 1, 1958 |